United States Patent
Yamamoto et al.

(10) Patent No.: US 8,032,382 B2
(45) Date of Patent: Oct. 4, 2011

(54) INFORMATION PROCESSING APPARATUS AND INFORMATION PROCESSING METHOD

(75) Inventors: Hiroki Yamamoto, Yokohama (JP); Tsuyoshi Yagisawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1092 days.

(21) Appl. No.: 11/614,242

(22) Filed: Dec. 21, 2006

(65) Prior Publication Data

US 2007/0150291 A1  Jun. 28, 2007

(30) Foreign Application Priority Data

Dec. 26, 2005  (JP) .................. 2005-372428

(51) Int. Cl.
  *G10L 15/00*  (2006.01)
(52) U.S. Cl. .................. 704/275; 704/251; 704/276
(58) Field of Classification Search .................. 704/251, 704/275, 276
See application file for complete search history.

(56) References Cited

U.S. PATENT DOCUMENTS

| | | | |
|---|---|---|---|
| 5,890,122 A * | 3/1999 | Van Kleeck et al. | 704/275 |
| 6,374,218 B2 * | 4/2002 | Kimura et al. | 704/251 |
| 2002/0013707 A1 | 1/2002 | Shaw | |
| 2002/0077830 A1 * | 6/2002 | Suomela et al. | 704/275 |

FOREIGN PATENT DOCUMENTS

| | | |
|---|---|---|
| EP | 1521239 | 4/2005 |
| JP | 61-040639 A | 2/1986 |
| JP | 2004-295578 A | 10/2004 |
| JP | 2005-242183 A | 9/2005 |
| KR | 10-2005-0015585 A | 2/2005 |

* cited by examiner

*Primary Examiner* — Daniel D Abebe

(74) *Attorney, Agent, or Firm* — Canon USA, Inc. IP Division

(57) ABSTRACT

An apparatus and method for speech information processing includes detecting a first operation of a speech processing start instruction element, controlling a display so that speech recognition information is displayed in response to the detection of the first operation, detecting a second operation of the speech processing start instruction element, acquiring speech information in response to detection of the second operation, and performing speech recognition processing on the speech information.

11 Claims, 18 Drawing Sheets

```
                          201
Word         Phonetic description
-------------------------------------
File         F:AY:L
Open         OW:P:AH:N
Close        K:L:OW:S
Volume       V:AA:L:Y:UW:M
Volume up    V:AA:L:Y:UW:M:AH:P
Volume down  V:AA:L:Y:UW:M:D:AW:N
Play         P:L:EY
Stop         S:T:AA:P
:            :
```

| Word | Processing |
|---|---|
| File | FileMenuOpen |
| Open | FileOpen |
| Close | FileClose |
| Volume | VolumeMenuOpen |
| Volume up | VolumeUp |
| Volume down | VolumeDown |
| Play | Play |
| Stop | Stop |
| : | : |

FIG. 16

| Title | Station | Date and Time | Information |
|---|---|---|---|
| .. | .. | | |
| Fight! | NHB general | 2005/08/15/08:15/08:30 | Story 5, Hanako decided to leave home ..... |
| .. | .. | | |
| Kids News | NHB educational | 2005/08/15/10:30/10:45 | Report from nature museum crowded during ... |
| .. | .. | | |
| Adventure TV | Japan TV | 2005/08/15/15:00/16:00 | Documentary about the wild cat in the ..... |
| .. | .. | | |

| Category | Term | Related term |
|---|---|---|
| Title | Adventure TV | Adventure |
| Title | Hey! Hey! Poffy AKIYUKI | Hey! Poffy |
| Title | Ichiro's NEWS7 | NEWS7 |
| : | | |
| : | | |
| Station | NHB general | NHB1 |
| Station | NHB educational | NHB2 |
| Station | Japan TV | JTV |
| Station | YBS television | YBS |
| : | | |
| : | | |

FIG. 18

| Word | Phonetic description | Processing |
|---|---|---|
| Next Page | N:EH:K:S:T:P:EY:JH | NextPage |
| Back | B:AE:K | Back |
| Scroll up | S:K:R:OW:L:AH:P | ScrollUp |
| Scroll down | S:R:OW:L:D:AW:N | ScrollDown |
| Cancel | K:AE:N:S:AH:L | Cancel |
| : | : | : |
| : | : | : |

FIG. 19

| Word | Phonetic Description | Category |
|---|---|---|
| Adventure TV | AH:D:V:EH:N:CH:ER:T:IT:V:IY | Title |
| The Mystery | DH:AH:M:IH:S:T:ER:IY | Title |
| Hey! Poffy | HH:EY:P:AH:F:AY | Title |
| Sunset News | S:AH:N:S:EH:T:N:UW:Z | Title |
| Lucky's great adventure | L:AH:K:IY:F:S:G:R:EY:T:AH:D:V:EH:N:CH:ER | Title |
| Ichiro's NEWS7 | IH:CH:IH:R:OW:Z:N:UW:Z:S:EH:V:AH:N | Title |
| .. | | |
| ATV | EY:T:IY:V:IY | Title Related |
| Hey! Hey! Poffy AKIYUKI | HH:EY:HH:EY:P:AH:F:AY:AH:K:IH:Y:UH:K:IH | Title Related |
| NEWS7 | N:UW:Z:S:EH:V:AH:N | Title Related |
| .. | | |
| NHB general | EH:N:EY:CH:B:IY:JH:EH:N:ER:AH:L | Station |
| NHB educational | EH:N:EY:CH:B:IY:EH:JH:AH:K:EY:SH:AH:N:AH:L | Station |
| .. | | |
| VOWVOW | V:AW:V:AW | Station |
| Japan TV | JH:AH:P:AE:N:T:IY:V:IY | Station |
| TV Tokyo | T:IY:V:IY:T:AO:K:IY:AH | Station |
| .. | | |
| NHB2 | EH:N:EY:CH:B:IY:T:UW | Station Related |
| JTV | JH:EY:T:IY:V:IY | Station Related |
| .. | .. | .. |

801

FIG. 20
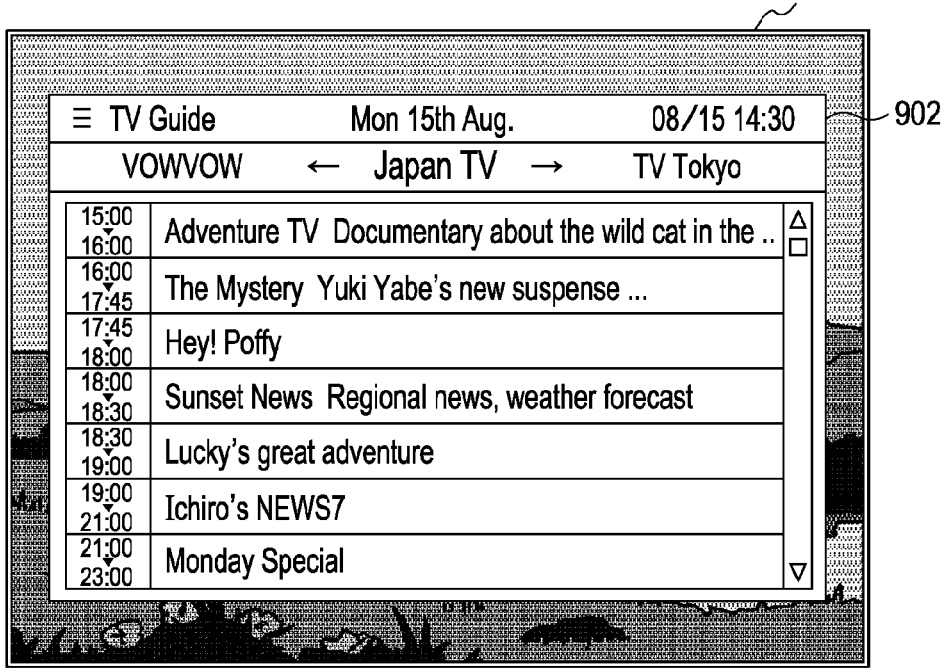
INDICATE RECOGNITION OBJECTS IN RESPONSE TO DETECTION OF VOICE INPUT START OPERATION
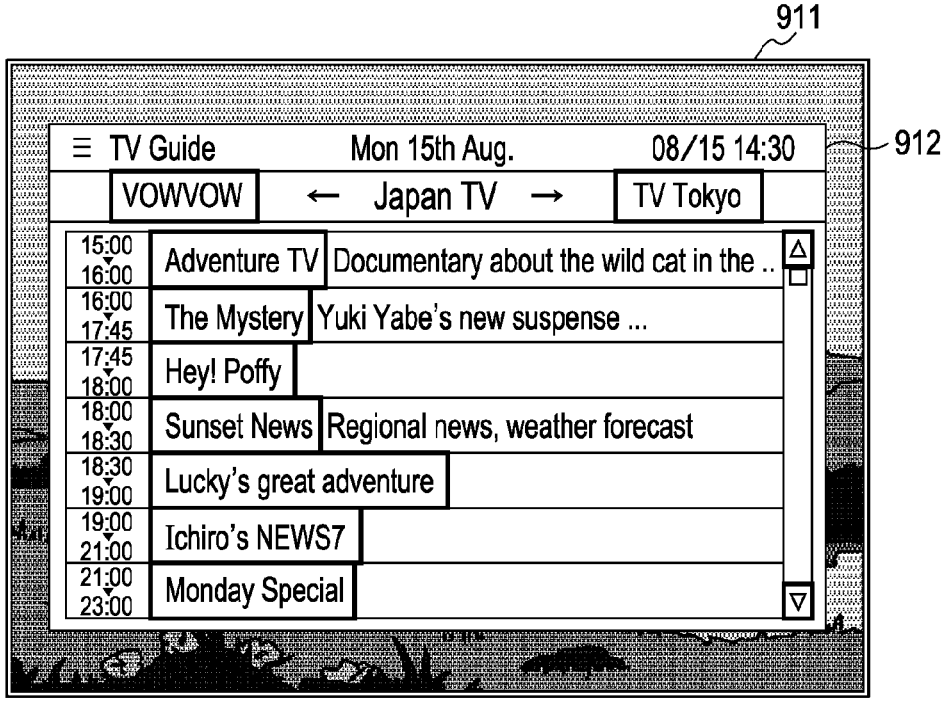

FIG. 21

INFORMATION PROCESSING APPARATUS AND INFORMATION PROCESSING METHOD

BACKGROUND OF THE INVENTION

1. Field of the Invention

The present invention relates to an information processing apparatus and an information processing method for indicating words that can be recognized through speech recognition.

2. Description of the Related Art

In known apparatuses and applications implementing speech recognition functions, situations often arise where users are not certain what to say when using the speech recognition functions. This has caused difficulty for the users in operating such speech recognition functions. To address this problem, techniques for indicating recognizable words to users are described in Japanese Patent Publication No. 04-075540, Japanese Patent Laid-Open No. 2004-295578, and Japanese Patent Laid-Open No. 2005-242183.

In a speech recognition apparatus described in Japanese Patent Publication No. 04-075540, an individual recognizable word lists is displayed in a bottom section of each GUI window, so that recognizable words for each window are notified to a user. In a translation device described in Japanese Patent Laid-Open No. 2004-295578, recognizable words displayed on a screen are highlighted using underlining or the like. In a speech recognition device described in Japanese Patent Laid-Open No. 2005-242183, when there is a recognizable word among words displayed on a screen, a screen display is controlled so that the recognizable word is displayed in a style different from the other words.

However, in the above documents, the timings at which switching of display/non-display of recognizable words is performed and at which a recognizable word is displayed are not described. There are types of apparatuses and applications which implement speech recognition techniques, but are capable of performing intended processing by means other than the speech recognition techniques. When the techniques described in the above documents are employed in such apparatuses or applications, recognizable words are displayed all the time while the speech recognition function is effective. This display style may be redundant and thus undesirable for users who operate the apparatuses or applications using means other than the speech recognition techniques.

SUMMARY OF THE INVENTION

The present invention has been made in view of the above circumstances. Accordingly, there is a need for an information processing method in which a speech recognition word is displayed in response to a voice input operation performed by a user. Thus, according to this method, speech recognition words are not indicated to the user when voice input is not performed even when operations using a speech recognition function are effective.

According to a first aspect of the present invention, there is provided a speech information processing apparatus including a first detecting unit configured to detect first operation of a speech processing start instruction element, a display controlling unit configured to control display of speech recognition information in response to the first operation of the speech processing start instruction element, a second detecting unit configured to detect second operation of the speech processing start instruction element, an acquiring unit configured to acquire speech information in response to the second operation of the speech processing start instruction element, and a speech recognizing unit configured to perform speech recognition processing on the speech information acquired by the acquiring unit.

According to a second aspect of the present invention, there is provided a method for processing speech information, the method including detecting first operation of a speech processing start instruction means, controlling a display so that speech recognition information is displayed in response to the detection of the first operation, detecting second operation of the speech processing start instruction means, acquiring speech information in response to the second operation, and performing speech recognition processing on the speech information.

Further features of the present invention will become apparent from the following description of exemplary embodiments with reference to the attached drawings.

BRIEF DESCRIPTION OF THE DRAWINGS

FIG. 16 shows an example of program information data used in an information processing apparatus according to an exemplary embodiment of the present invention.

FIG. 17 shows an example of related term data used in an information processing apparatus according to an exemplary embodiment of the present invention.

FIG. 18 shows an example of a recognition dictionary used in information processing apparatus according to an exemplary embodiment of the present invention.

FIG. 19 shows an example of a recognition dictionary used in information processing apparatus according to an exemplary embodiment of the present invention.

FIG. 20 illustrates a case where a display is controlled so that recognition objects are identified in an exemplary embodiment.

FIG. 21 illustrates a case where a display is controlled so that regions showing recognition objects are identified in an exemplary embodiment.

DESCRIPTION OF THE EMBODIMENTS

In the following, preferred exemplary embodiments of the present invention will be described with reference to the accompanying drawings.

First Embodiment

Figure 1:
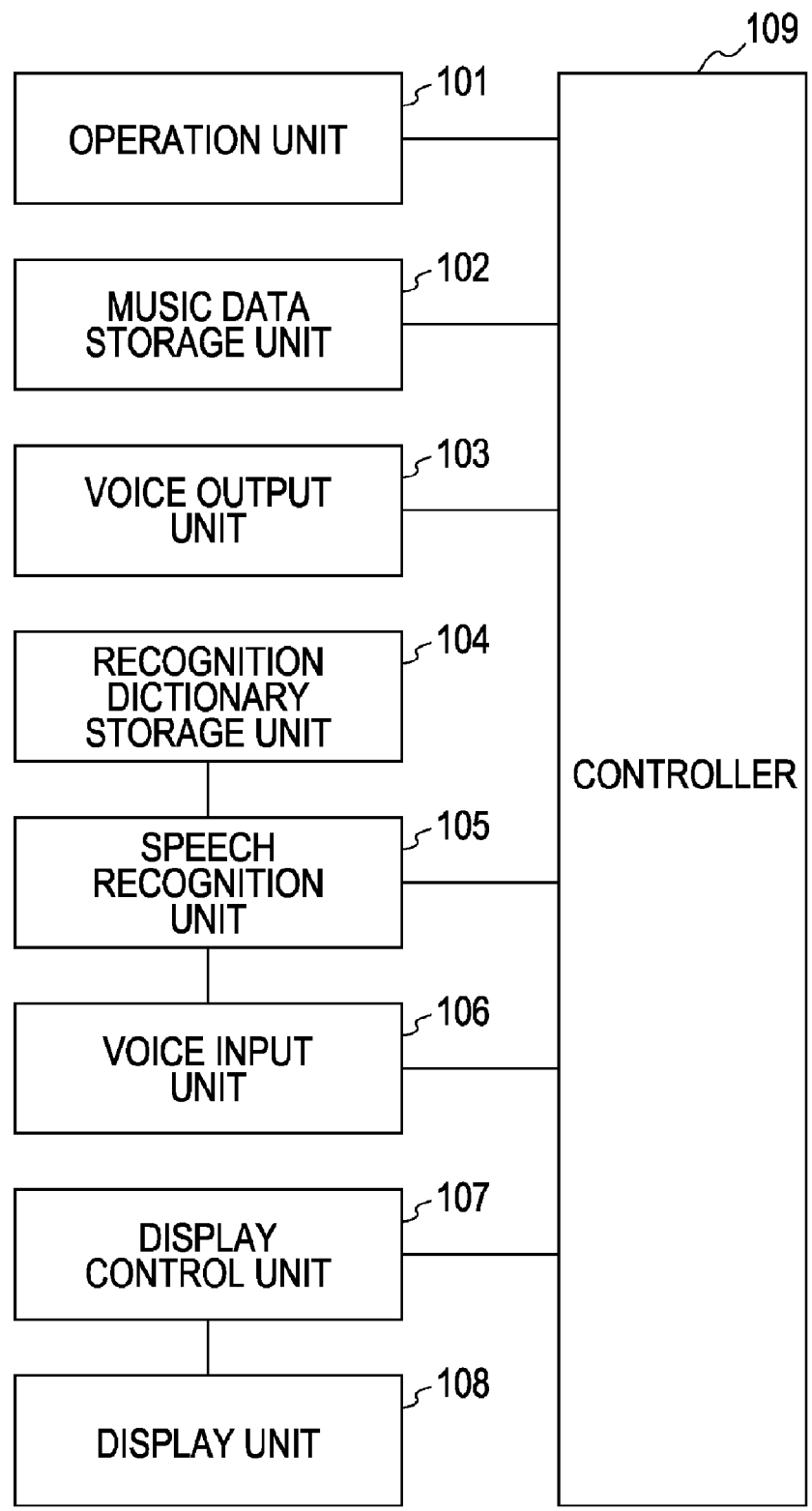
FIG. 1 is a block diagram illustrating an information processing apparatus according to an exemplary embodiment of the present invention.

This exemplary embodiment will be described using an example of an application for playing back music data selected by a user. FIG. 1 is a block diagram schematically illustrating a configuration of an information processing apparatus according to an exemplary embodiment of the present invention, which is provided with such an application for playing back music data. The information processing apparatus includes an operation unit 101, a music data storage unit 102, a voice output unit 103, a recognition dictionary storage unit 104, a speech recognition unit 105, a voice input unit 106, a display control unit 107, a display unit 108, and a controller 109.

The operation unit 101 includes an input device, such as a button and a mouse, which allows a user to operate the information processing apparatus. The content of an operation performed by the user using the operation unit 101 is detected by the controller 109. The controller 109 then performs predetermined processing in accordance with the detected operation. In this exemplary embodiment, when the user speaks to use a speech recognition function, the user performs a predetermined operation using the input device included in the operation unit 101. This operation serves to instruct the initiation of voice processing. The input device used for such an operation may be a dedicated input device or a general-purpose input device such as a keyboard and mouse, in which a specific button or the like is given the function of instructing the initiation of the voice processing. In the following, a case will be described where a button is used as the input device for instructing the initiation of voice processing. This button is herein referred to as a speech processing start instruction button.

The music data storage unit 102 stores music data. The voice output unit 103 is provided with an audio output device such as a speaker and outputs the music data when a user performs an operation for playing back music.

Figures 2, 3:
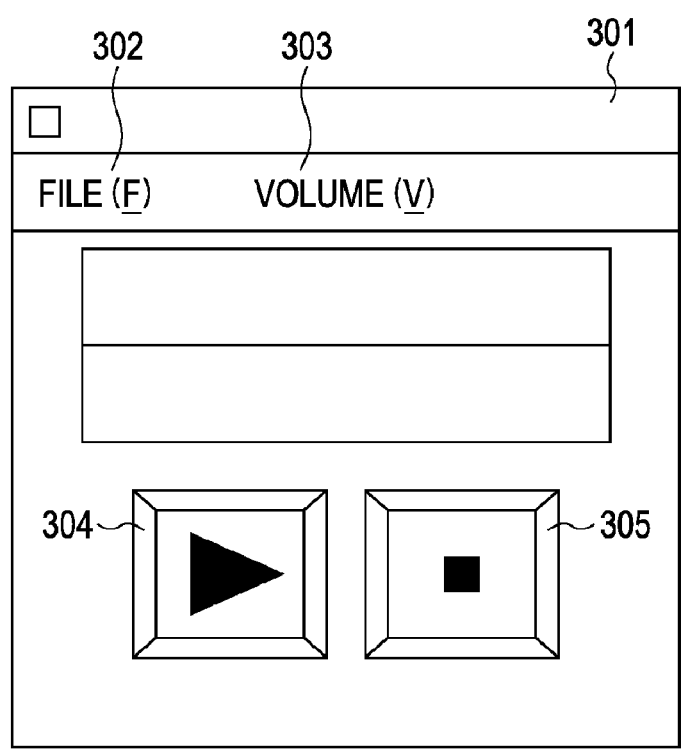
FIG. 2 shows an example of a recognition dictionary according to an embodiment of the present invention.
FIG. 3 illustrates a display of an information processing apparatus according to an exemplary embodiment of the present invention.

The recognition dictionary storage unit 104 stores a recognition dictionary. In this recognition dictionary, words that can be recognized by the speech recognition unit 105 and corresponding phonetic descriptions are recorded. In this context, phonetic description indicates a pronunciation of a word by predefined phonetic symbols such as those defined by the IPA (International Phonetic Alphabet). Such a word that can be recognized by the speech recognition unit 105 is hereinafter referred to as a speech recognition word. An example of such a recognition dictionary is illustrated in FIG. 2. The voice input unit 106, provided with a microphone, picks up speech of the user. The picked up speech is converted into digital data so as to be processed by the speech recognition unit 105. The speech recognition unit 105 performs speech recognition processing on the data corresponding to the speech of the user, which is picked up by the voice input unit 106 and selects a word closest to the picked-up speech of the user from the words recorded in the recognition dictionary. Then the speech recognition unit 105 outputs the selected word as a recognition result.

The display unit 108 has a display device such as a liquid crystal display so as to display data such as information from the information processing apparatus to the user, and a GUI (graphical user interface). The display control unit 107 controls display contents to be displayed on the display unit 108. One feature of the display control unit 107 is that it controls display contents such that speech recognition words are displayed when the controller 109 detects a predetermined operation performed on the speech processing start instruction button. Specifically, when the user speaks, the display control unit 107 causes the speech recognition words to be displayed so as to indicate words which can be spoken by the user.

The controller 109 detects an operation performed through the operation unit 101 and executes processing in accordance with the content of the operation. In addition, the controller 109 cooperates with other modules in the information processing apparatus so as to control processing relating to music data reproduction such as selection, reading, and playing back of music data.

In the following, an operation performed by the information processing apparatus having the above configuration will be described.

When the application for playing back music data according to the present exemplary embodiment is activated, the display control unit 107 generates display contents and displays the display contents on the display unit 108. Examples of such display contents are illustrated in FIG. 3. As illustrated in the figure, a file menu 302, a volume menu 303, a button 304 for starting play back of music data, and a button 305 for stopping the play back of music data are displayed in a main window 301.

The menus 302 and 303 are hierarchical menus used in typical GUIs. Each of the menus has associated submenus which are displayed when the menu is selected. In this exemplary embodiment, the submenu of the file menu 302 contains "Open" and "Close", and the submenu of the volume 303 contains "Volume up" and "Volume down", which are not shown in the figure.

The user operates these GUIs using a mouse or the like. A description of such user operations will be omitted. In the following, an operation performed by the user for this application using speech recognition will be described using a case in which the user speaks after depressing the speech processing start instruction button.

Figure 4:
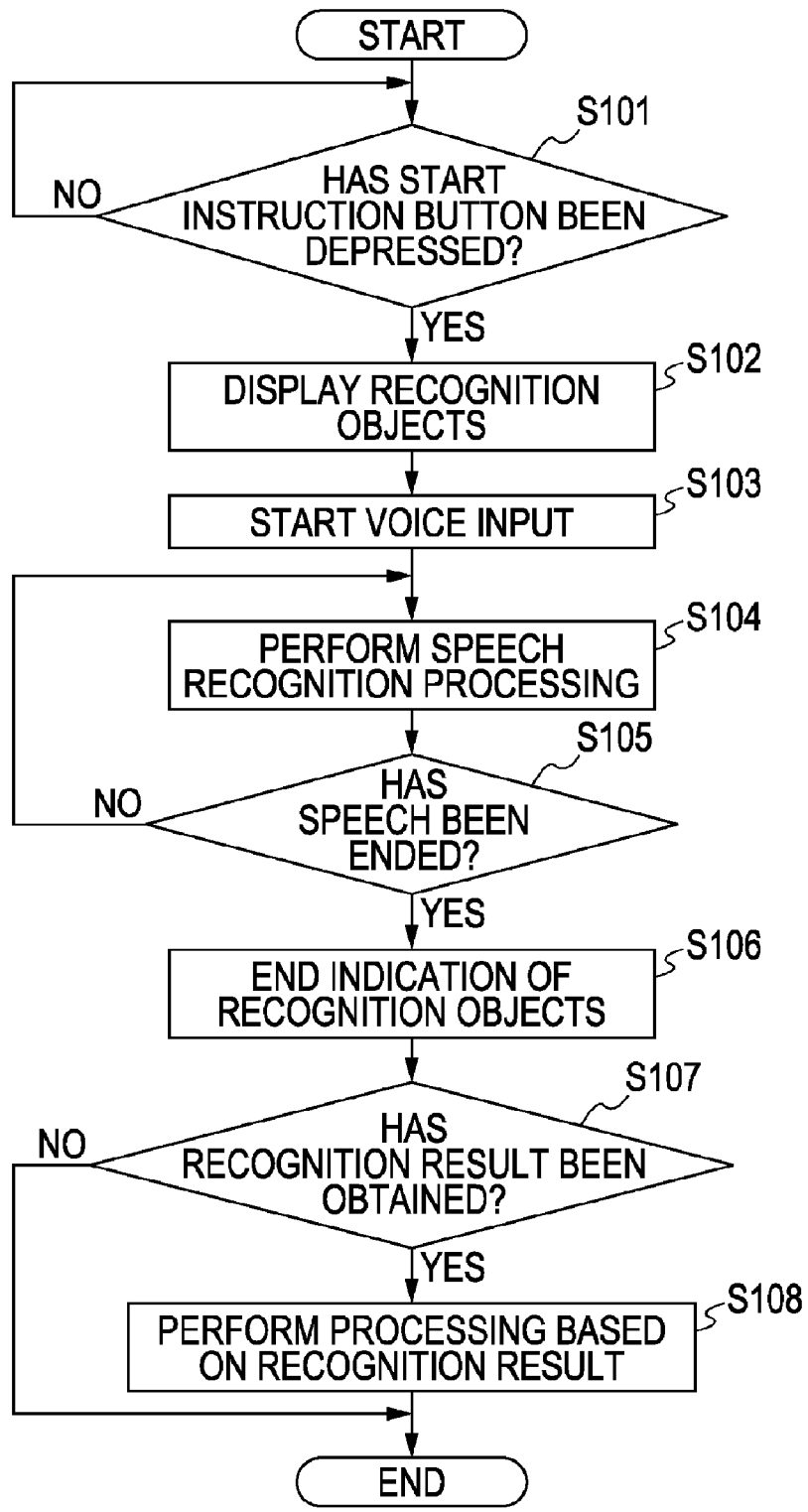
FIG. 4 is a flowchart illustrating a processing procedure performed by an information processing apparatus according to an exemplary embodiment of the present invention.

Referring to FIG. 4, a flowchart illustrates a processing procedure performed when an information processing apparatus according to the present exemplary embodiment is operated using the speech recognition function. A program for implementing the processing procedure is stored in a storage device (not shown) and executed on the basis of control performed by the controller 109.

Figure 5:
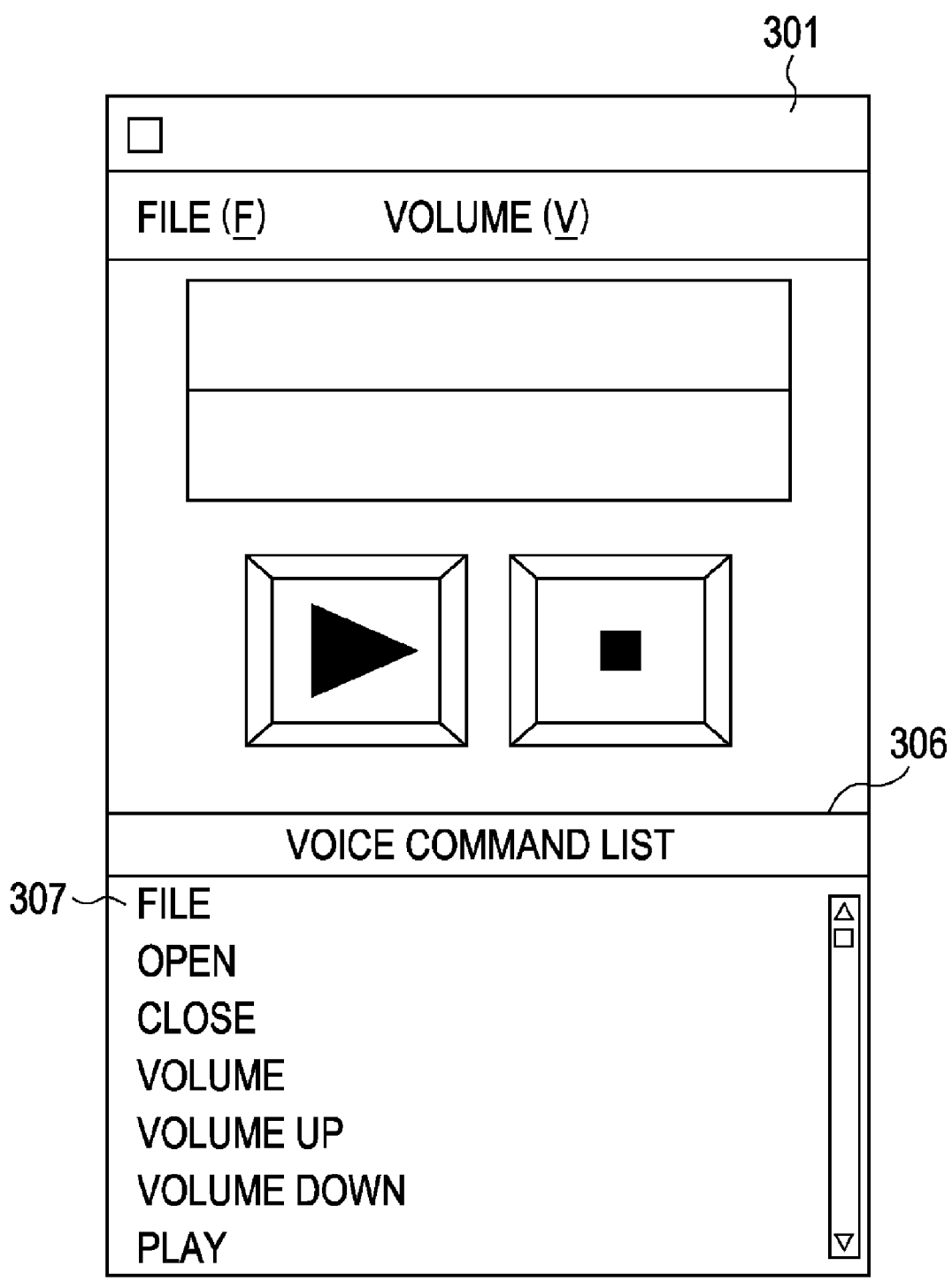
FIG. 5 illustrates a case where speech recognition words are indicated in an exemplary embodiment.

When a user desires to use the speech recognition function, the user first depresses the speech processing start instruction button. When the controller 109 detects the pressing of the speech processing start instruction button ("yes" in STEP S101), the display control unit 107 refers to the recognition dictionary stored in the recognition dictionary storage unit 104 and controls the display contents so that commands that can be spoken (i.e., speech recognition words) are displayed, at STEP S102. An example of the display contents to be displayed on the display unit 108 is shown in FIG. 5. As shown in the figure, an area 306 is added to the main window 301 by the control by the display control unit 107, and speech recognition words 307, for example, are displayed. In this example, the speech recognition words are displayed in the main window 301. However, it is also possible that a subwindow can be generated for displaying these speech recognition words.

Referring back to the flowchart in FIG. 4, subsequently to the processing of STEP S102, voice input is initiated in the voice input unit 106, at STEP S103. Note that both the processing of STEP S102 and S103 can be initiated simultaneously.

Speech data picked up by the voice input unit 106 is processed by the speech recognition unit 105 until the end of the speech of the user is detected (STEP S104 and "no" in STEP S105).

When the end of the speech has been detected by the speech recognition unit 105 ("yes" in STEP S105), the voice input and the speech recognition processing are terminated. Then, the display contents are controlled by the display control unit 107 so that the display of the speech recognition words is terminated, at STEP S106. Specifically, at this time, the display contents displayed on the display unit 108 are the same as those displayed before the speech recognition words were displayed in STEP 102, as shown in FIG. 3.

Subsequently, at STEP S107, if a result of the speech recognition processing has not been obtained in the speech recognition unit 105 for reasons such as interruption of the speech or absence of voice to be picked up after the pressing of the speech processing start instruction button ("no" in STEP S107), the processing procedure is terminated.

Figures 6, 7:
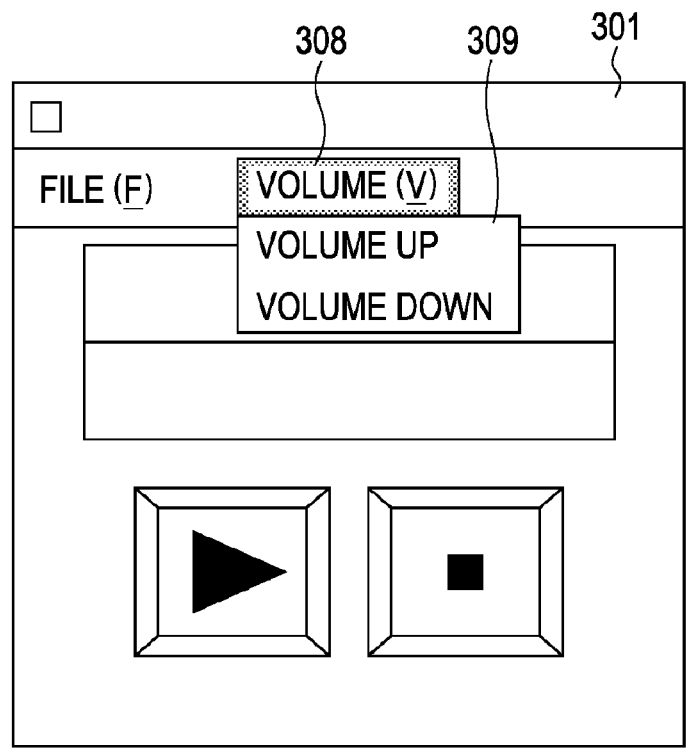
FIG. 6 illustrates processing performed when a word "Volume" is recognized according to an exemplary embodiment.
FIG. 7 illustrates a table in which a recognition result and a corresponding processing are recorded, according to an exemplary embodiment.

If a result of the speech recognition processing has been obtained ("yes" in STEP S107), the recognition result is output to the controller 109. Then, the controller 109 executes processing on the basis of the recognition result, at STEP S108. For example, the recognition result is "Volume", the controller 109 executes the same processing as that to be executed when the volume menu 303 is selected by the mouse or the like. FIG. 6 illustrates the result of this processing. The figure illustrates a situation where "Volume" (308) has been selected and thus a submenu 309 of "Volume" is displayed. A relationship between recognition results and corresponding processing can be described in advance in the program that controls the information processing apparatus. It is also possible that a correspondence table in which the relationship is recorded is provided in the controller 109. An example of such a correspondence table is shown in FIG. 7. In the above example where the "Volume" is recognized, the controller 109 executes processing indicated as "VolumeMenuopen" (702) which corresponds to "Volume".

In the above description, the end of speech is detected by the speech recognition unit 105. However, it can also be configured such that the user explicitly indicates the end of speech. For example, the user can speak while depressing the speech processing start instruction button. In this case, the controller 109 determines the end of speech when it detects that the speech processing start instruction button returns to an undepressed state from a depressed state (release of the button) ("yes" in STEP S105). With this configuration, the speech recognition words displayed by the user depressing the speech processing start instruction button are held displayed as long as the user keeps the button in the depressed state. When user releases the speech processing start instruction button, the display of the speech recognition words is terminated.

Various schemes for displaying recognition words in the processing of STEP S102 can be employed. Examples of such displaying schemes are illustrated in FIGS. 8 to 12.

Figure 8:
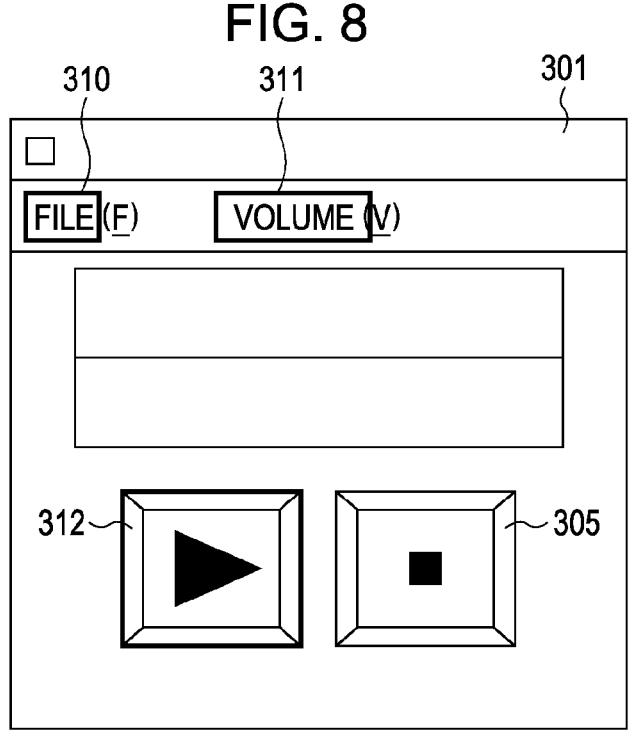
FIG. 8 illustrates a case where a display is controlled so that a recognition object is identified in an exemplary embodiment.

FIG. 8 illustrates a case where information which can be spoken by the user is indicated so that the user can distinguish words which can be spoken from among information displayed on a screen. As shown in the figure, a file menu 310, a volume menu 311, and a playback button 312 are enclosed by thick lines, so that it is indicated that these menus and button are objects that can be recognized through speech recognition processing (recognition objects). On the other hand, it is indicated that the stop button 305 cannot be recognized through speech recognition processing, i.e., speech corresponding to the button 305 is not recognized. Thus, the display is controlled so that information serving as speech recognition objects can be distinguished from among displayed information. With this arrangement, the user can be effectively notified of words to be spoken.

Figure 9:
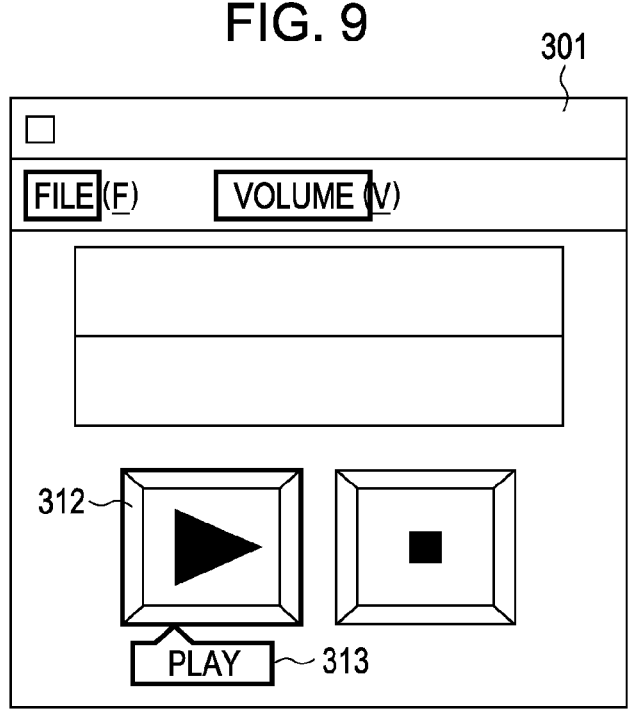
FIG. 9 illustrates a case where a word used for recognizing a recognition object represented by an icon or symbol is displayed in an exemplary embodiment.
Figure 10:
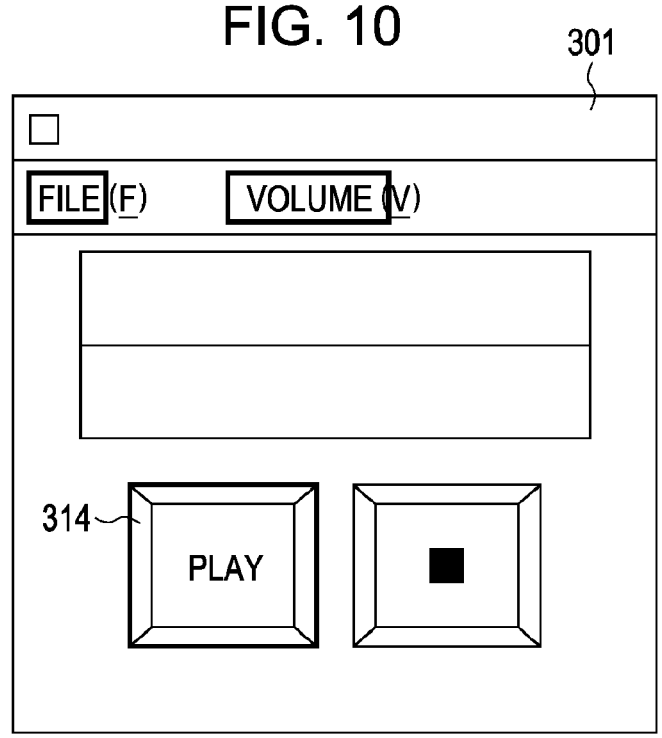
FIG. 10 illustrates a case where a word used for recognizing a recognition object represented by an icon or symbol is displayed in an exemplary embodiment.

Each of FIG. 9 and FIG. 10 illustrates an example of a case in which a word used for recognizing a corresponding recognition object displayed in the form of a symbol or an icon as shown in FIG. 8. FIG. 9 illustrates a case where a speech recognition word "Play" (shown in a region 313) is added to the playback button 312. FIG. 10 illustrates a case where the playback button 312 is replaced by the speech recognition word "Play" (shown as a button 314). Since a word which can be associated with a symbol or an icon depends on the users, and a symbol can have a plurality of names, a user is not certain what to say to cause the symbol or icon to be recognized. For example, a user may associate the playback button 312 with a word "Play" or a word "Start". Thus, with the display schemes illustrated in FIG. 9 and FIG. 10, the ambiguity of words can be eliminated, which allows the user to speak with certainty in using the speech recognition function.

Figure 11:
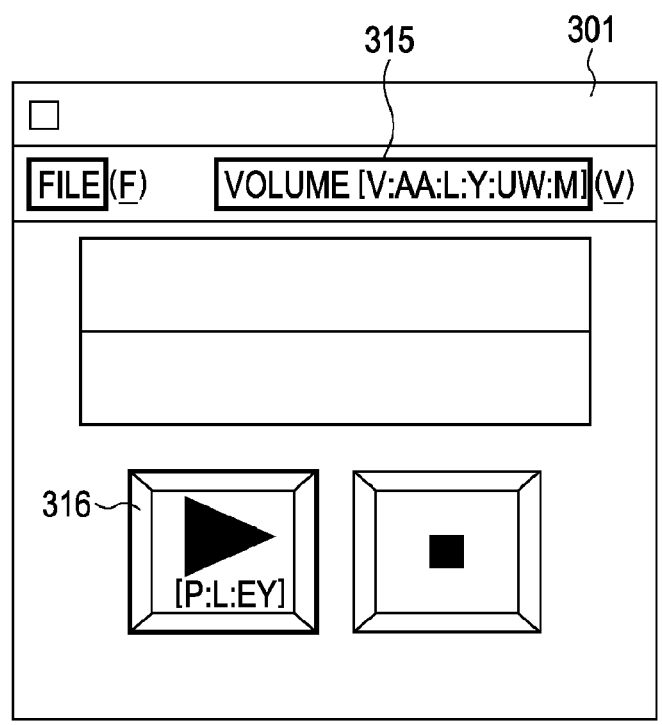
FIG. 11 illustrates a case where a phonetic description of a recognition object is indicated in an exemplary embodiment.

FIG. 11 shows an example of a case in which a phonetic description for a corresponding speech recognition object is provided. As shown in the figure, a phonetic description is provided to the corresponding speech recognition word shown in a region 315. In addition, a phonetic description is provided to the corresponding symbol or icon shown as a button 316. This arrangement can prevent users from making a mistake in reading displayed words or symbols.

Figure 12:
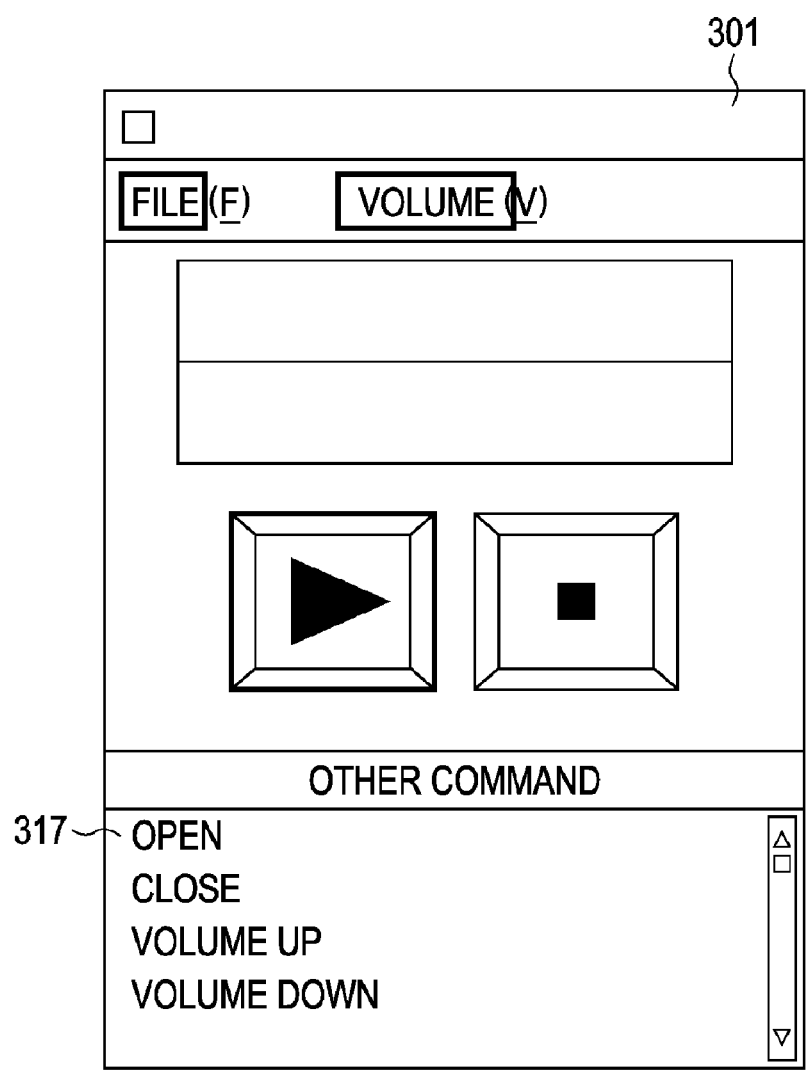
FIG. 12 illustrates a case where recognition words which have not displayed in a window are indicated in an exemplary embodiment.

FIG. 12 shows an example of a case where speech recognition words that are not displayed in a window are indicated to the user. In this example, a list of words used for recognizing the submenus of a file menu and a volume menu is added to the main window 301. With this display scheme, it is possible to notify the user that there are speech recognition words other than those displayed in the main window.

According to the configuration according to the present exemplary embodiment described above, speech recognition words are indicated in response to an operation performed by a user for starting speech. Thus, when the user uses a speech recognition function, he or she can be notified of speech recognition words without paying special attention to the speech recognition words. In addition, since the user does not perform the operation for starting speech when the speech recognition function is not necessary, the speech recognition words are not displayed or indicated on a screen. That is, a redundant display of unnecessary information can advantageously be avoided. Thus, information processing apparatus having the above-described features permits the realization of an audio interface with high operability for a user using the speech recognition function or not using the speech recognition function.

Second Embodiment

In the first embodiment described above, display of speech recognition words and voice input are started simultaneously with detection of the pressing of the speech processing start instruction button. However, this may leads to a situation where surrounding noise is misrecognized as speech of a user while he or she is looking at the displayed speech recognition words to determine what to say. Thus, in this exemplary embodiment, processing for displaying the speech recognition words and processing for starting voice input can be performed at different times through an operation of a button for starting speech. This can be realized using an information processing apparatus having the same configuration as the information processing apparatus described in the first embodiment. Specifically, in this exemplary embodiment, pressing and release of the speech processing start instruction button are detected. In response the detection of the pressing of the speech processing start instruction button, the speech recognition words are displayed. Then, in response to the release of the speech processing start instruction button, the voice input is started.

Figure 13:
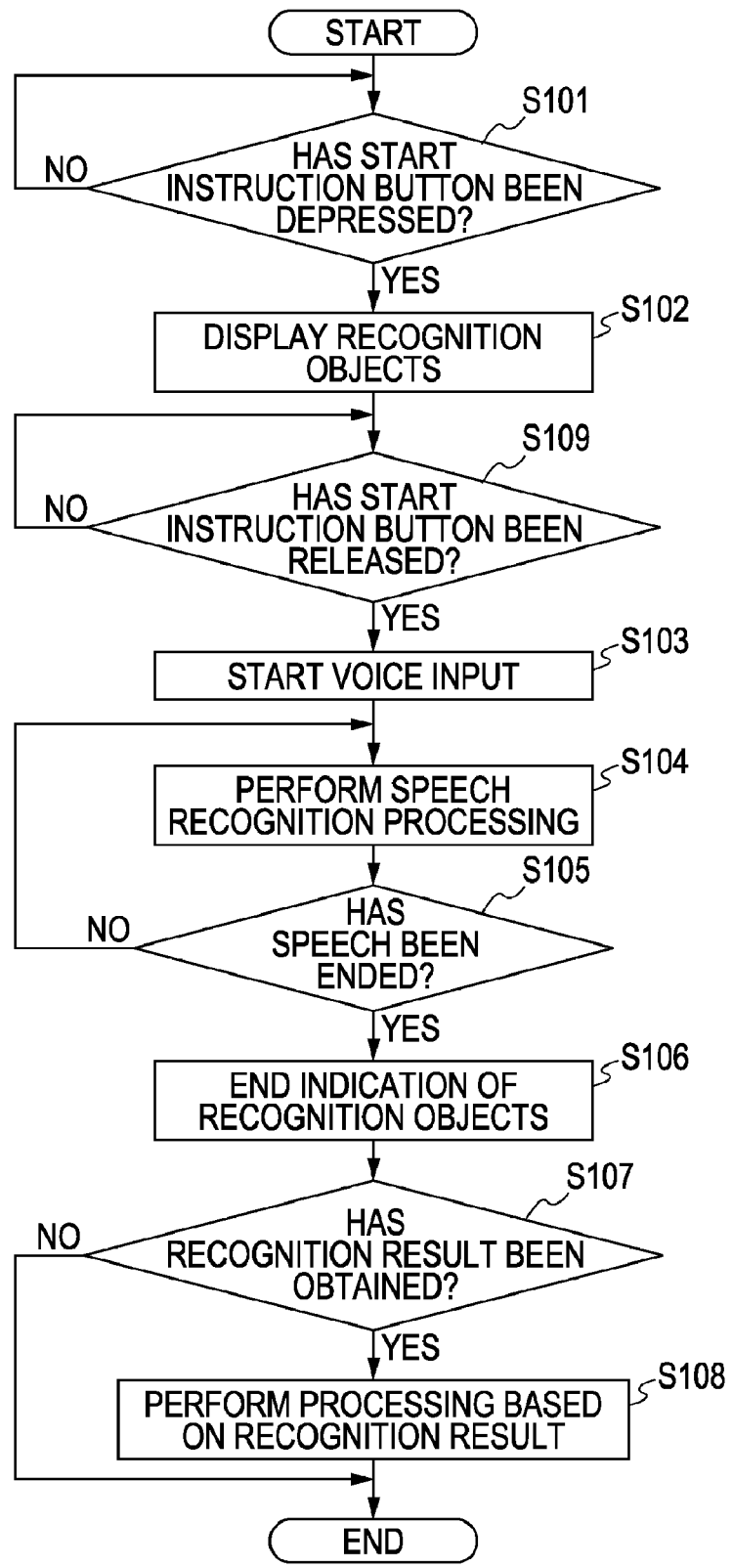
FIG. 13 is a flowchart illustrating a processing procedure performed by information processing apparatus according to an exemplary embodiment of the present invention.

In the following, a processing procedure according to this exemplary embodiment will be described with reference to a flowchart shown in FIG. 13. The flowchart is different from the processing procedure according to first embodiment described using FIG. 4 in that processing of STEP S109 is added between the processing of STEP S102 and STEP S103. Descriptions concerning processing other than STEP S109 will be omitted where possible.

When the controller 109 detects pressing of the speech processing start instruction button ("yes" in STEP S101), display contents are controlled by the display control unit 107 so that speech recognition words are displayed, at STEP S102. This procedure is the same as that performed in the first embodiment.

Then, at STEP S109, processing does not proceed until the release of the speech processing start instruction button is detected by the controller 109 ("no" in STEP S109). During this period, voice input is not performed. When the release of the speech processing start instruction button is detected by the controller 109, voice input is initiated in the voice input unit 106, at STEP S103. The processing procedure performed thereafter is the same as that of the first embodiment, and the description thereof will be omitted.

According to the above configuration, processing for displaying the speech recognition words and processing for starting the voice input can be performed at different times. Thus, according to this exemplary embodiment, the user has sufficient time to see the speech recognition words before he or she starts speaking for voice input, which increases user operability.

Third Embodiment

In this exemplary embodiment, half pressing and full pressing of the speech processing start instruction button are distinguishably detected so that processing for displaying the speech recognition words and processing for starting voice input can be performed at different times. Note that half pressing refers to a state in which a button is depressed lightly as in a case where a typical autofocus camera is made to focus. In this exemplary embodiment, when a user depresses the speech processing start instruction button halfway, speech recognition words are indicated. Then, when the user further depresses the speech processing start instruction button (full pressing), voice input is initiated. When the speech processing start instruction button is released from the half pressed state, the indication of the speech recognition words is terminated.

Figure 14:
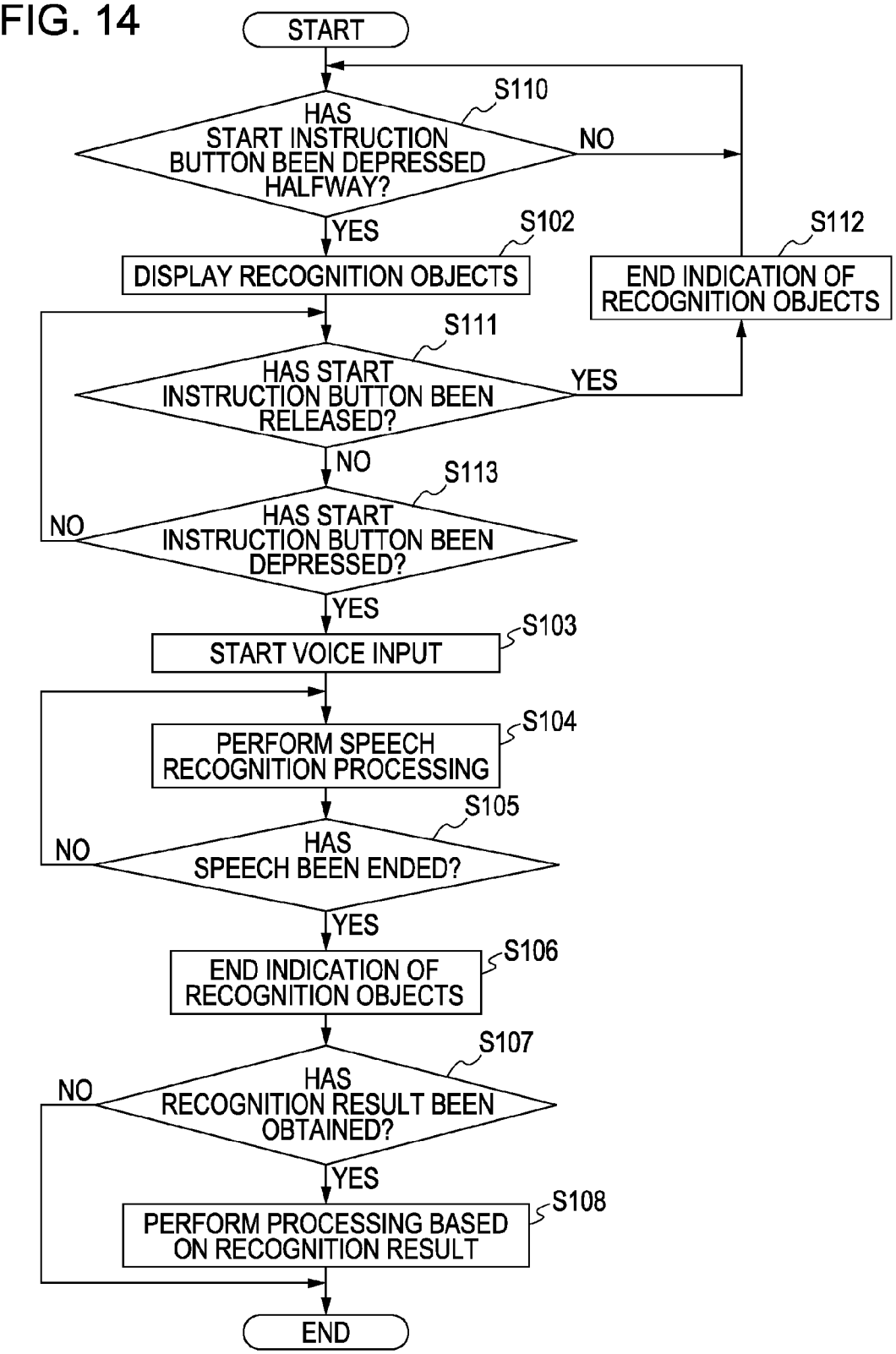
FIG. 14 is a flowchart illustrating a processing procedure performed by information processing apparatus according to an exemplary embodiment of the present invention.

In the following, a processing procedure according to this exemplary embodiment will be described with reference to a flowchart shown in FIG. 14.

The flowchart is different from the flowchart shown in FIG. 4 according to the first embodiment in that processing of STEP S110 is performed instead of the processing of STEP S101 and in that processing of STEP S111 to STEP S113 is performed between the processing of STEP S102 and STEP S103. Processing other than these processings is performed similarly to the first embodiment, and the descriptions thereof will be omitted where possible.

When the controller 109 detects half pressing of the speech processing start instruction button ("yes" in STEP S110), the display control unit 107 controls the display contents so that speech recognition words are indicated, at STEP S102.

Subsequently, at STEP S111, the processing does not proceed until release or full pressing of the speech processing start instruction button is detected by the controller 109 ("no" in STEP S111, "no" in STEP S113). During this period, voice input is not started. When the release of the speech processing start instruction button is detected ("yes", in STEP S111), the display control unit 107 controls the display contents so that the indication of the speech recognition words is terminated, at STEP S112.

When the user further depresses the speech processing start instruction button from the half pressed state, and the full pressing of the button is detected by the controller 109 ("yes" in STEP S113), voice input is started in the voice input unit 106, at STEP S103. The processing procedure performed next is the same as that of the first embodiment, and the description thereof will be omitted.

According to the above configuration, processing for displaying the speech recognition words and processing for starting the voice input can be performed at different times. Thus, according to this exemplary embodiment, the user has sufficient time to see the speech recognition words before he or she starts speaking for voice input, which increases user operability.

Fourth Embodiment

In this exemplary embodiment, a case will be described where the present invention is implemented in a program searching apparatus.

Figure 15:
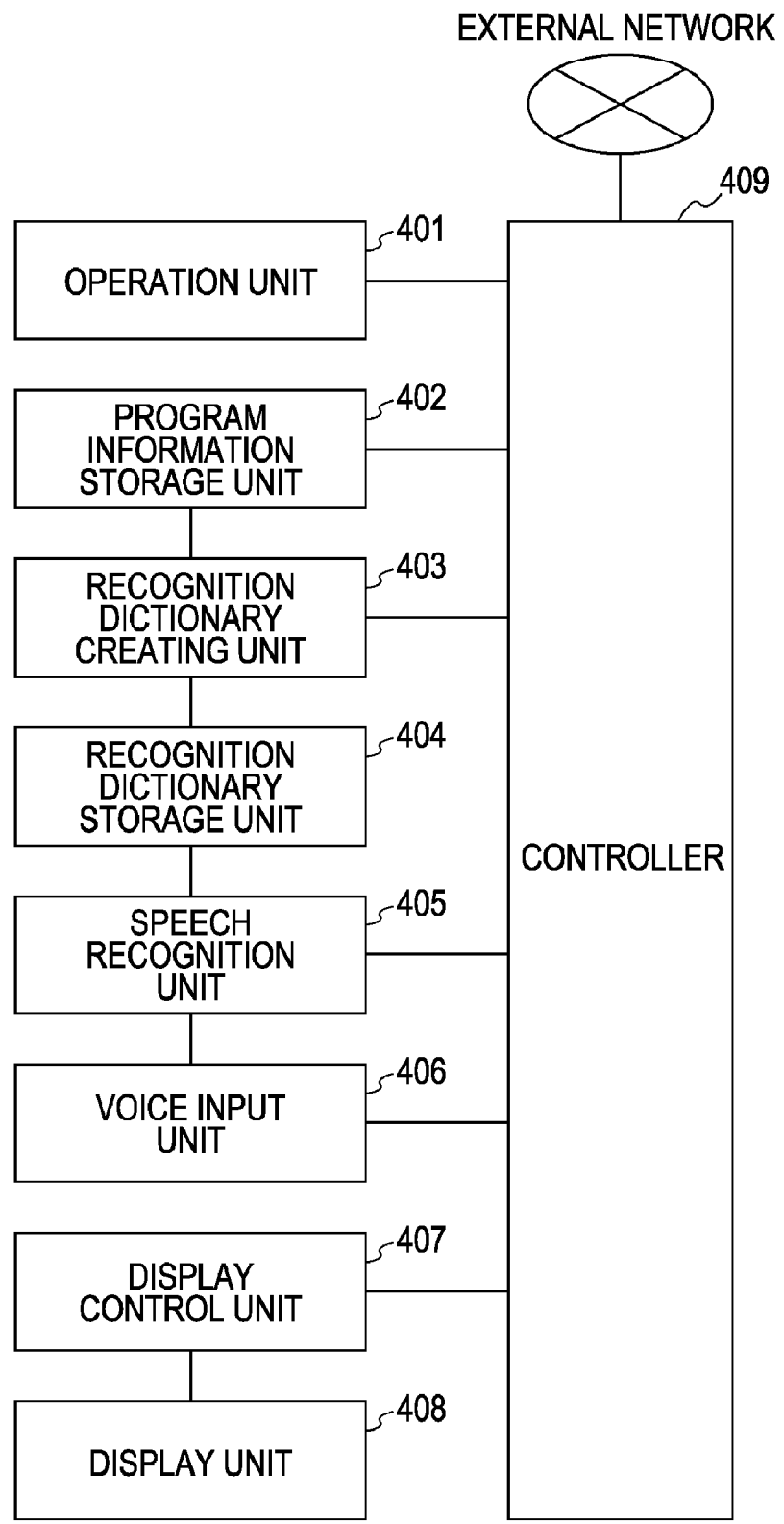
FIG. 15 is a block diagram illustrating a configuration of an information processing apparatus according to an exemplary embodiment of the present invention.

FIG. 15 is a block diagram schematically illustrating a configuration of an information processing apparatus for searching for a program, according to an exemplary embodiment of the present invention. The information processing apparatus includes an operation unit 401, a program information storage unit 402, a recognition dictionary creating unit 403, a recognition dictionary storage unit 404, a speech recognition unit 405, a voice input unit 406, a display control unit 407, a display unit 408, and a controller 409.

The operation unit 401 has an input device such as a button and a mouse which allows a user to operate the apparatus, similarly to the operation unit 101 described in the first embodiment. The content of an operation performed by the user through the operation unit 401 is detected by the controller 409. Then the controller 409 performs predetermined processing in accordance with the detected operation. Also in this exemplary embodiment, a button used by the user for starting speech is referred to as a speech processing start instruction button, as in the case of the first embodiment.

The program information storage unit 402 stores program information data such as an EPG (electronic program guide) which is received by the controller 409. As shown in program information data 501 illustrated in FIG. 16, this program information storage unit 402 stores "Title" (name of program), "Station" (name of station), "Date and Time" (date and time of broadcasting), and "Information" (information on program) for each program. In addition, as shown in related term data 601 illustrated in FIG. 17, data concerning a term related to the name of a station or the name of program is also stored in the program information storage unit 402. Such related term data can be included in the EPG data or can be obtained from an external network as data independent of the EPG data.

The recognition dictionary storage unit 404 stores a recognition dictionary. In the recognition dictionary, words that can be recognized by the speech recognition unit 405 (speech recognition words) and corresponding phonetic descriptions are recorded. In addition, supplementary information associated with each recognition word can also be recorded. In this exemplary embodiment, commands for operating the information processing apparatus and keywords for searching for programs are employed as the speech recognition words. An example of the recognition dictionary is shown in each of FIG. 18 and FIG. 19. A recognition dictionary 701 illustrated in FIG. 18 contains words used as commands for operating the information processing apparatus according to this exemplary embodiment. In the recognition dictionary 701, in addition to a phonetic description, corresponding processing is recorded as supplementary information for each recognition word. The corresponding processing is to be performed when the corresponding speech recognition word is recognized. A recognition dictionary 801 illustrated in FIG. 19 contains words used as keywords for searching for programs. Categories of the keywords are recorded as supplementary information.

The recognition dictionary creating unit 403 extracts keywords necessary for searching for titles, stations or the like from the program information data 501 and records therein corresponding phonetic descriptions and categories so as to create a recognition dictionary used for program search. In addition, it is also possible that a term related to each keyword is extracted from the related term data 601 and added to the recognition dictionary. For example, when a title "Adventure TV" is extracted from the program information data 501 as a keyword, "Adventure" is extracted from the related term data 601 as a related term to be added to the recognition dictionary.

The voice input unit 406 is provided with a microphone and picks up speech of the user and converts the picked up speech into digital data so as to be processed by the speech recognition unit 405. The speech recognition unit 405 performs speech recognition processing on the speech data picked up by the voice input unit 406 and selects a word closest to the speech of the user from the words recorded in the recognition dictionary to output the selected word as a speech recognition result.

The display unit 408 has a display device such as a liquid crystal display and serves to display a GUI and information such as program information to be provided from the information processing apparatus to the user. The display control unit 407 controls contents to be displayed on the display unit 408. In this exemplary embodiment, when the controller 409 detects an operation for starting voice input, which is performed by the user, the display control unit 407 controls the display contents so that the user can identify the speech recognition words. For example, if a speech recognition word or a GUI component (speech recognition object) is included in the display contents displayed when a voice input operation is initiated, the display contents are controlled so that the display style of the recognition object, such as font, color, and decoration, is changed so that the recognition object can be distinguished from other words or GUI components. For other speech recognition words which are not included in the display contents, for example, the display contents are controlled such that a separate window is generated to display these speech recognition words. When a speech recognition result has been obtained, the display contents are controlled so that program information provided by the controller 409 is displayed. If the voice input is interrupted during a voice input operation due to a timeout or an operation by the user, the display contents are controlled so as to display again the contents which were displayed before the voice input operation.

The controller 409 cooperates with each module included in the information processing apparatus according to this exemplary embodiment to controls the entire processing of the program search. In addition, the controller 409 receives program information data transmitted via an external network and stores the program information data in the program information storage unit 402. The controller 409 also monitors an operation event of the input device such as a mouse and a keyboard and executes processing in accordance with the operation event. Further, the controller 409 searches for the program information data stored in the program information storage unit 402 on the basis of a word recognized by the speech recognition unit 405 and then outputs information concerning a program corresponding to the searched program information data. In the case where a related term dictionary is provided by an external unit, the controller 409 serves to receive the dictionary.

In the following, an operation of the information processing apparatus having the above configuration will be described.

A processing procedure performed in the information processing apparatus according to this exemplary embodiment is the same as that performed in the information processing apparatus described in the first embodiment. Thus, the processing procedure will be described in accordance with the flowchart shown in FIG. 4.

When a program search operation is initiated, the display control unit 407 performs control so that display data used for program search is generated on the basis of the program information data stored in the program information storage unit 402. The generated display data is then displayed on the display unit 408. An example of such displayed data is shown in FIG. 20. The figure illustrates a screen shot 901 of the display device included in the display unit 408. A screen display 902 is an example of display contents displayed at the time when a program search operation is started. In the screen display 902, programs of a station "Japan TV" are displayed in the broadcast time order. The user selects a desired program from the displayed programs. If the desired program is not included in the displayed programs, the user can scroll the display to display different time slots, or can change the station to be displayed to look for the desired program. These operations are performed by the user using the speech recognition function or the input device of the operation unit 401.

When the user uses the speech recognition function, he or she speaks a command: the name of a desired program when selecting a program; the name of a desired station when switching stations, and "Scroll Down" when scrolling the display down. The user performs a predetermined operation for initiating voice input before he or she speaks. In this exemplary embodiment, a specific button provided on the input device of the operation unit is allocated as a button to be used for initiating voice input (speech processing start instruction button). When the user depresses the speech processing start instruction button, voice input is initiated, as described below. When the speech processing start instruction button is depressed by the user, the pressing of the button is detected by the controller 409. Then, voice pickup is started in the voice input unit 406 ("yes" in STEP S101).

At STEP S102, display contents are changed by the display control unit 407 so that speech recognition objects can be distinguished from the other objects displayed on the display unit 408. At this time, the display control unit 407 refers to the recognition dictionary stored in the recognition dictionary storage unit 404. If a word recorded in the recognition dictionary is included in the screen display, the display style for the recorded word, such as font, color, and decoration, is changed. Similarly, if a GUI component corresponding to a command recorded in the recognition dictionary is included in the screen display, the display style for the GUI component is changed. This is illustrated in a screen display 912 shown in FIG. 20 as an example. In the screen display 912, titles, stations, and GUI components for scrolling are enclosed by thick lines, so that these enclosed objects are indicated as the speech recognition objects.

The speech picked up by the voice input unit 406 is sequentially converted into digital data so as to be processed by the speech recognition unit 405, at STEP S103. At the time when the end of the speech of the user is detected by the speech recognition unit 405, the speech recognition processing and the voice input in the voice input unit 406 are terminated. When the voice input is terminated ("yes" in STEP S105), the display control unit 407 terminates the indication of the speech recognition words. Specifically, the display contents changed in the processing of STEP S102 are changed back as shown in the screen display 902 in FIG. 20, at STEP S106.

If a result of the speech recognition processing has not been obtained in the speech recognition unit 405 for reasons such as interruption of speech and absence of voice to be picked up after the pressing of the speech processing start instruction button ("no" in STEP S107), the program search operation is terminated.

If a result of the speech recognition processing has been obtained in the speech recognition unit 405 ("yes" in STEP S107), the controller 409 executes processing in accordance with the speech recognition result, at STEP S108, and then terminates the program search operation. For example, when a title has been recognized as the speech recognition result, the controller 409 searches for the program information data stored in the program information storage unit 402. If a program corresponding to the title is stored in the program information data, the display control unit 407 causes the display unit 408 to display information on the program. On the other hand, if such a corresponding title is not stored in the program information data, the display control unit 407 causes the display unit 408 to display a notification of the result, at STEP S108. Then, the program search operation is terminated.

With the above-described configuration according to this exemplary embodiment, speech recognition objects included in a screen display are indicated in response to an operation performed by a user for starting voice input. Thus, when the user uses the speech recognition function, he or she can be notified of such recognition objects without paying specific attention to the recognition objects. In addition, it is advantageous not to display unnecessary information to avoid redundancy when the user does not use the speech recognition function. According to the information processing apparatus according to the present exemplary embodiment, whether the user uses the speech recognition function or not, an audio interface with high operability can be realized.

Other Embodiments

Figure 21:
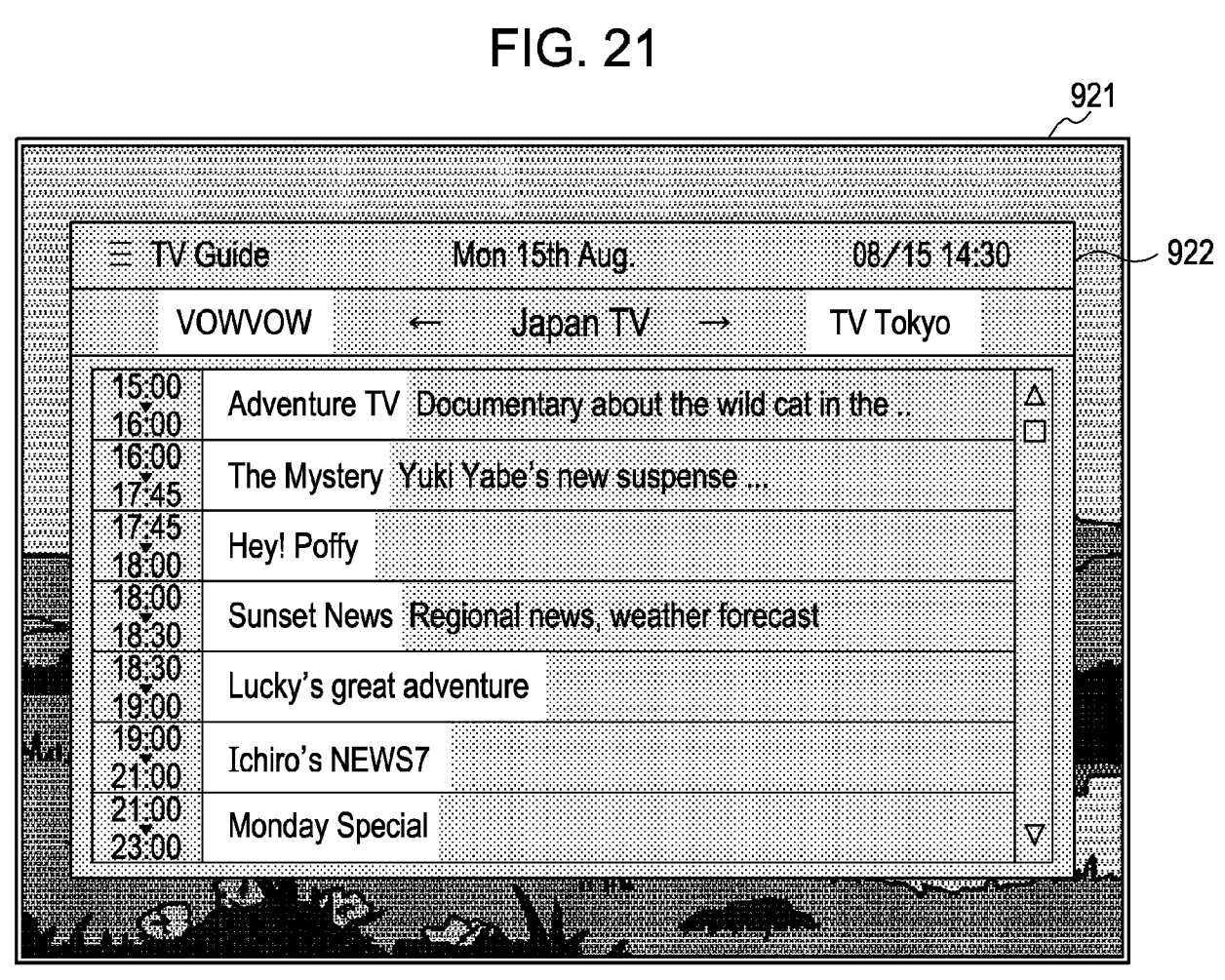

In the fourth embodiment described above, the case is described in which the display style for speech recognition objects displayed on a screen is changed in the processing of STEP S102. However, in contrast to this, display contents can be controlled so that the display style for displayed object other than the speech recognition objects is changed, which also allows the speech recognition objects to be distinguished. This arrangement is illustrated in FIG. 21. As shown in the figure, an area in a screen display 922 showing objects other than speech recognition objects is darkened, so that the other area showing the speech recognition objects are distinguishable.

Figure 22:
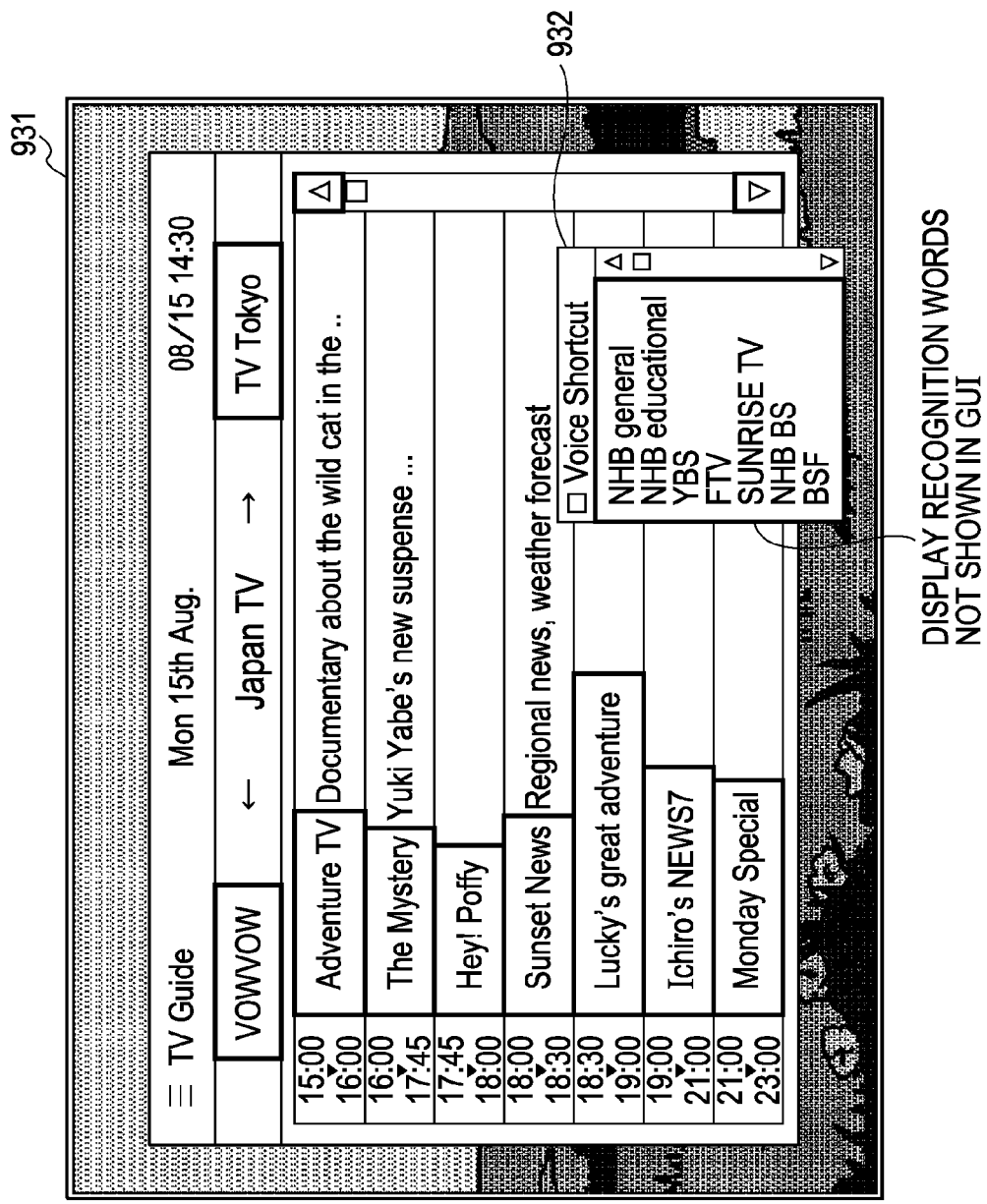
FIG. 22 illustrates a case where recognition objects which have not been displayed in a window are indicated in an exemplary embodiment.

In addition, when speech recognition objects are indicated in the processing of STEP S102, speech recognition words that are not displayed in a screen can be displayed. In this case, the display control unit 407 controls display contents so that, among the words recorded in the recognition dictionary stored in the recognition dictionary storage unit 404, the words that are not currently displayed in the screen are displayed. This arrangement is illustrated in FIG. 22. As shown in the figure, all of the speech recognition words that are not displayed on a GUI screen are displayed in another window 932.

Figure 23:
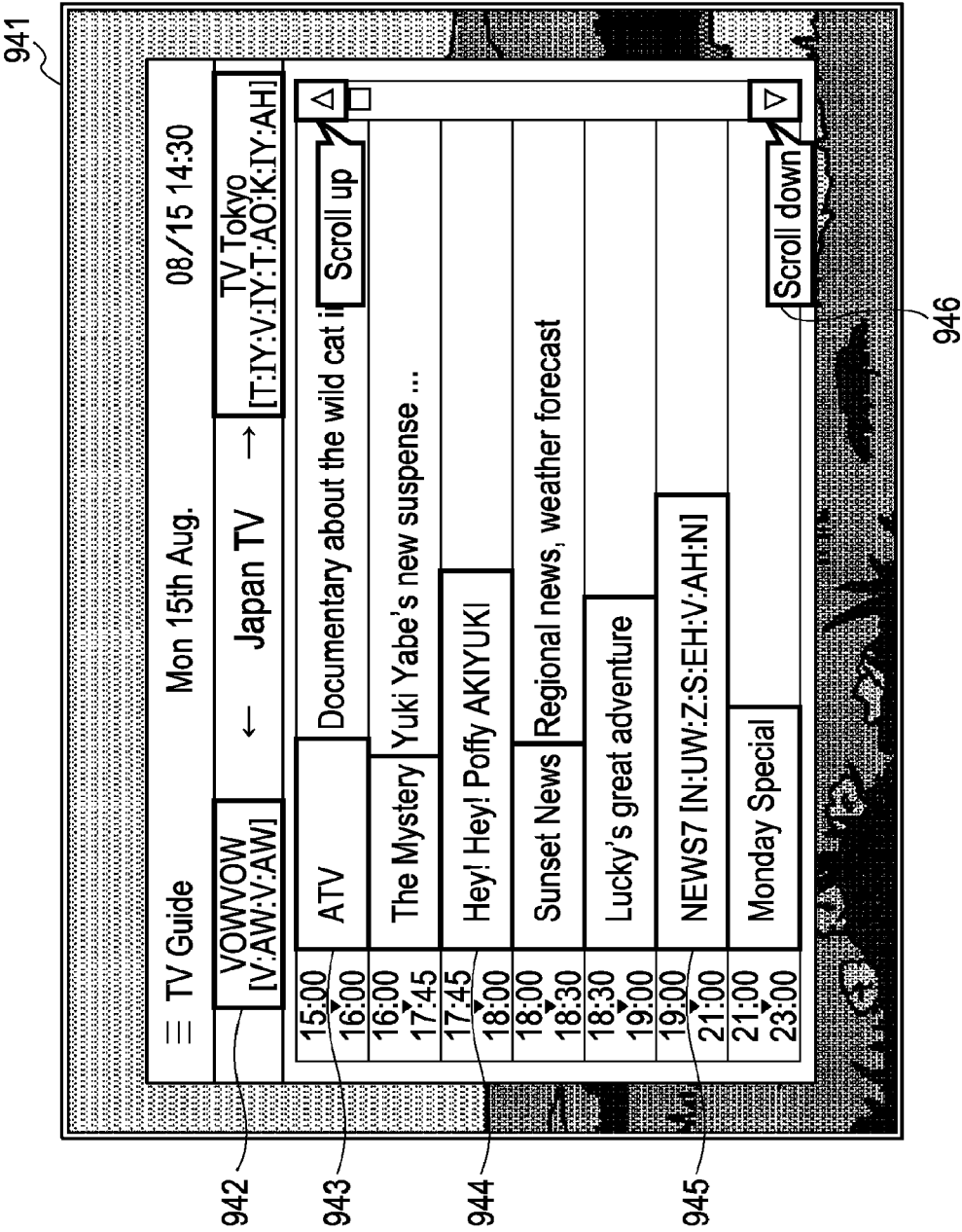
FIG. 23 illustrates various cases where display contents of recognition objects are changed in an exemplary embodiment.

Further, when speech recognition objects are displayed in the processing of STEP S102, words to be displayed can be abbreviated or abbreviated names to be displayed can be returned to the original name. At this time, the related term data 601 and the recognition dictionaries 701 and 801 are referred to. In addition, the content of an object to be spoken and a corresponding phonetic description can also be displayed by referring to the recognition dictionaries 701 and 801. This arrangement is illustrated in FIG. 23. In the figure, a region 942 illustrates a case where the phonetic description of the name of a station "VOWVOW" is provided using the recognition dictionary 801. A region 944 illustrates a case where a title "Hey! Poffy", which has been abbreviated using the related term data 601 is replaced by its original name "Hey! Hey! Poffy AKIYUKI". A region 945 illustrates a case where, using the related term data 601 and the recognition dictionary 801, the original name of a title "Ichiro's NEWS7" is replaced by the abbreviated title "NEWS7", and further the corresponding phonetic description is provided. In addition, a region 946 illustrates a case where a speech recognition word "Scroll Down" corresponding to a GUI component is indicated using a word balloon. This arrangement allows a user to know the word for causing the GUI component to be recognized.

As described above, when speech recognition objects are displayed, a phonetic description can be added, and a name difficult to pronounce can be replaced. This arrangement realizes a user interface with increased operability, compared with the case described above where the speech recognition objects are displayed simply so as to be distinguished from other objects.

The present invention also encompasses arrangements wherein a program for realizing the functions of the above-described embodiments are supplied either directly or from a remote site to a system or an apparatus having a computer capable of reading executing the supplied program code.

Thus, program code to be supplied and installed to the computer for realizing the functions of the above-described embodiments is also a feature that realizes the present invention. That is, the computer program for implementing the function of the above-described embodiments may be encompassed in the present invention.

In this case, the program is not restricted to any form, such as object code, a program executed by an interpreter, script data supplied to the Operating System, or the like.

Examples of the recording media for supplying the program include magnetic recording media such as floppy disks, hard disks, optical disks, magneto-optical disks (MO), compact disk-read-only memory (CD-ROM), CD-recordable (CD-R), CD-rewriteable (CD-RW). For recording media, magnetic tapes, non-volatile memory cards, read-only memory (ROM), digital versatile disk-ROM (DVD-ROM), DVD-R, and so forth can be employed.

As another program supply method, a client computer may be connected to a homepage on the Internet using a browser, and the computer program itself of the present invention or a compressed file containing an automatic install function may be downloaded from the homepage to a recording medium such as a hard disk. A program code that constitutes the program according to an exemplary embodiment of the present invention may be divided into a plurality of files, and the files may be downloaded from different homepages. That is, a WWW server which causes a plurality of users to download a program file that causes a computer to implement the functional processing of the present invention may also be incorporated in the present invention.

In addition, an arrangement may be made wherein the program according to an exemplary embodiment the present invention is encrypted and stored in a recording medium such as a CD-ROM and distributed to the user in this state, with key information for decrypting the encryption being downloaded from an Internet homepage, for example, to users which satisfy certain conditions, so that the encrypted program can be executed and installed to the computer using the key information.

In addition to the functions of the above-described embodiment being realized by the program read out being executed on a computer, the functions of the above-described embodiment may be realized by the Operating System running on the computer performing part or all of the actual processing based on instructions of the program.

Moreover, the functions described above may be realized by the program read out from the recording medium being written to memory provided to a function expansion board inserted into the computer or a function expansion unit connected to the computer, and the CPU of the function expansion board or function expansion unit performs part or all of actual processing on the basis of the instructions of the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-372428 filed Dec. 26, 2005, which is hereby incorporated by reference herein in its entirety.

What is claimed is:

1. A speech information processing apparatus comprising:
a first detecting unit configured to detect a first operation of a speech processing start instruction element;
a display controlling unit configured to control display of speech recognition information from a first time point where the first detecting unit detects the first operation of the speech processing start instruction element;
a second detecting unit configured to detect a second operation of the speech processing start instruction element, wherein the second operation is an operation corresponding to the speech processing start instruction element, which is newly detected while continuing an operation detected as the first operation of the speech processing start instruction element, and wherein the second operation is different from the first operation;
an acquiring unit configured to acquire speech information, from a second time point where the second detecting unit detects the second operation of the speech processing start instruction element, wherein the second time point is different from the first time point; and
a speech recognizing unit configured to perform speech recognition processing on the speech information acquired by the acquiring unit.

2. A speech information processing apparatus according to claim 1, wherein the display controlling unit is configured to control the display so that the speech recognition information can be visually distinguished from other displayed information.

3. The speech information processing apparatus according to claim 1, wherein the speech processing start instruction element is a button, wherein the first operation comprises pressing the button, and wherein the second operation comprises releasing the button.

4. The speech information processing apparatus according to claim 1, wherein the speech processing start instruction element is a button,
wherein the first operation comprises depressing the button a portion of a maximum distance the button can be depressed,
wherein the second operation comprises depressing the button the maximum distance the button can be depressed, and
wherein the display controlling unit terminates a display of the speech recognition information in a case where the second operation is not detected and the button is released after the first operation is detected.

5. The speech information processing apparatus according to claim 1,
wherein if there is a speech recognition word other than the displayed speech recognition information, the display controlling unit displays the speech recognition word in addition to the displayed speech recognition information.

6. The speech information processing apparatus according to claim 1,
wherein if an object included in the displayed speech recognition information is a graphical user interface component, the display controlling unit displays a name used for recognizing the graphical user interface component to associate the name with the graphical user interface component.

7. The speech information processing apparatus according to claim 1, further comprising a related term storage unit configured to store a word related to displayed speech recognition information, wherein if a related term corresponding to displayed speech recognition information is recorded, the display controlling unit replaces the speech recognition information with the related term or displays the related term in addition to the speech recognition information.

8. The speech information processing apparatus according to claim 1,
wherein the display controlling unit displays a phonetic description for a speech recognition information in addition to the speech recognition information, wherein the phonetic description causes the speech recognition word to be recognized.

9. A method for processing speech information, the method comprising:
    detecting a first operation of a speech processing start instruction means;
    controlling a display so that speech recognition information is displayed from a first time point where the first operation of the speech processing start instruction means is detected;
    detecting a second operation of the speech processing start instruction means, wherein the second operation is an operation corresponding to the speech processing start instruction means, which is newly detected while continuing an operation detected as the first operation of the speech processing start instruction means, wherein the second operation is different from the first operation;
    acquiring speech information, from a second time point where the second operation of the speech processing start instruction means is detected, wherein the second time point is different from the first time point; and
    performing speech recognition processing on the acquired speech information.

10. A method according to claim 9, wherein the display is controlled such that the speech recognition information can be distinguished visually from other displayed information.

11. A computer-readable recording medium storing computer-executable process steps, the computer-executable process steps causing a computer to execute the method of claim 9.

* * * * *